(12) United States Patent
Morency et al.

(10) Patent No.: US 6,945,025 B2
(45) Date of Patent: Sep. 20, 2005

(54) SHREDDER HEAD WITH PROTECTIVE ELEMENTS, AND MOBILE SYLVICULTURAL APPARATUS INCLUDING THE SAME

(75) Inventors: Jimmy Morency, St. Felicien (CA); David Potvin, Dolbeau-Mistassini (CA)

(73) Assignee: Nokamic, Inc. (CA)

( * ) Notice: Subject to any disclaimer, the term of this patent is extended or adjusted under 35 U.S.C. 154(b) by 0 days.

(21) Appl. No.: 10/889,694

(22) Filed: Jul. 12, 2004

(65) Prior Publication Data

US 2005/0044839 A1 Mar. 3, 2005

(30) Foreign Application Priority Data

Jul. 10, 2003 (CA) .............................................. 2434640
Jan. 16, 2004 (CA) .............................................. 2456016

(51) Int. Cl.⁷ .............................................. A01D 34/42
(52) U.S. Cl. .......................................... 56/504; 241/191
(58) Field of Search ......................... 56/504, 249, 500, 56/505; 460/112, 901; 241/195, 197, 191, 294, 243, 73; 172/28

(56) References Cited

U.S. PATENT DOCUMENTS

| | | | | |
|---|---|---|---|---|
| 2,575,057 A | * | 11/1951 | Keiper | 241/200 |
| 4,344,581 A | * | 8/1982 | Redemann | 241/88.4 |
| 5,332,164 A | * | 7/1994 | Page | 241/239 |
| 5,413,286 A | * | 5/1995 | Bateman | 241/190 |
| 5,472,147 A | * | 12/1995 | Doppstadt | 241/88.4 |
| 5,497,950 A | * | 3/1996 | Schrodl | 241/191 |
| 6,047,912 A | * | 4/2000 | Smith | 241/32 |
| 6,227,469 B1 | * | 5/2001 | Daniels et al. | 241/186.3 |
| 6,517,020 B1 | * | 2/2003 | Smith | 241/294 |
| 6,592,061 B2 | * | 7/2003 | Watajima et al. | 241/191 |
| 6,845,931 B1 | * | 1/2005 | Smith | 241/55 |

* cited by examiner

Primary Examiner—Árpád Fab Kovács
(74) Attorney, Agent, or Firm—Donald R. Boys; Central Coast Patent Agency, Inc.

(57) ABSTRACT

A shredder head, and a mobile apparatus including the same, for carrying out various sylvicultural applications, such as land clearing and the like. Each of the shredding assemblies of the shredder head includes a protective element also operatively connected to the rotor for rotating therewith along the given direction of rotation, the protective element extending along the respective plane of its corresponding shredding assembly and defining a peripheral radius of action with respect to the axle when the rotor is rotated about the axle, the protective element being positioned upstream of and being aligned with the shredding knife during rotation of the rotor, and the peripheral radius of action of the protective element being substantially identical to the peripheral radius of action defined by the cutting edge of the shredding knife so that said shredding knife is protected by the passage of the protective element during operation of the shredding head.

17 Claims, 10 Drawing Sheets

US 6,945,025 B2

SHREDDER HEAD WITH PROTECTIVE ELEMENTS, AND MOBILE SYLVICULTURAL APPARATUS INCLUDING THE SAME

FIELD OF THE INVENTION

The present invention relates to an improved shredder head. More particularly, the present invention relates to a shredder with integrated protective elements, and also relates to a mobile sylvicultural apparatus provided with such a shredder head, generally a pair of shredder heads, the apparatus being used for carrying out various cutting and processing applications, such as on vegetation, brush, trees, and the like. The present shredder head may be used on other types of apparatuses and vehicles, and in various other different fields, such as agriculture and the like.

BACKGROUND OF THE INVENTION

Grinding heads, shredder heads, and the different mobile apparatuses used therewith for carrying out various sylvicultural applications, are well known in the art.

FIG. 1 shows a grinding head 101 commercialised under FECON™ BULLDOG BH-80. The grinding head 101 is typically mounted onto a corresponding apparatus and operated along a given direction of rotation 113, over a terrain to be treated, for carrying out grinding applications thereon. Indeed, this type of grinding head 101 is devised for preparing the terrain according to well known sylvicultural principles. Grinding hammers 125 are used for grinding vegetation and penetrating into the ground, and since the hammers 125 penetrate the ground, the vegetation above the ground is generally well processed (i.e. is well ground). This approach enables to avoid the premature wear or the breaking of cutting tools/knifes which would otherwise be used with shredder heads. However, the quality of processing (e.g. cutting) of the vegetation tends to be imperfect, stems tend to remain half-cut and the stumps often remain too long, which is undesirable because it goes against silvicultural principles, as is well known in the art.

Shredder heads are similar to grinding heads, except that they are used mainly for cutting and shredding applications, and thus the above-mentioned hammers are replaced by cutting tools or shredding knives, as can be easily understood.

FIG. 2 is a side view of a pair of adjacent shredding assemblies 111 of a shredder head commercialised under CIMAF™. The shredding assemblies are operated along a given direction of rotation 113 and each shredding assembly 111 including a shredding knife 117. A major drawback associated with this type of device is that during ground level operation, the shredding knives 117 frequently encounter rocks and/or other unwanted debris, and thus may break and/or wear out prematurely, which is very disadvantageous for obvious reasons known in the art.

FIGS. 3–5 show different views of a shredder head also commercialised under CIMAF™. As shown, the shredder head includes shredding knives 117 having a given radius of action. This type of shredder head is devised for carrying out the preparation of the terrain. The knives' main function is to grind, and even brush cut the vegetation. Each of the knives 117 is mounted onto a disk 127 having a radius of action 123 being at a height "h" smaller than a radius of action 121 of the knife 117, as better shown in FIG. 4. The disk 127 essentially fulfills two functions. On one end, the disk reinforces the support of the knife, by increasing the support surface of the support of the knife on the rotor. On another end, the disk 127 limits the material to be cut that the knife 117 meets at each rotation of the rotor, to the material found above the radius of action 123 of the disk 127. However, a major disadvantage that results with this type of device is that, when operating at ground level, the knives 117 frequently penetrate into the ground and meet rocks, which prematurely wears or even breaks the knives 117. The repairing an/or the replacement of the worn out or broken knives 117 increases the costs and slows down the work carried out with the apparatus, which is also very undesirable for obvious reasons known in the art.

Hence, in light of the aforementioned, there is a need for an improved shredder head which, by virtue of its design and components, would be able to overcome some of the above-discussed prior art problems.

SUMMARY OF THE INVENTION

The object of the present invention is to provide a shredder head which satisfies some of the above-mentioned needs and which is thus an improvement over other related shredded heads known in the prior art.

In accordance with the present invention, the above object is achieved, as will be easily understood, with a shredder head for passing over a terrain to be treated and with vegetation to be cut and processed, the shredder head comprising:

an elongated axle;

a rotor mounted onto the axle, the rotor being rotable about the axle along a given direction of rotation;

a plurality of shredding assemblies, each of the shredding assemblies being mounted to the rotor for rotating therewith along the given direction of rotation, and each of the shredding assemblies being positioned adjacent to one another and extending along a respective plane transversal to the axle, each of the shredding assemblies comprising:

a support operatively connected to the rotor for rotating therewith along the given direction of rotation;

a shredding knife securely mounted onto the support, for cutting vegetation to be processed, the shredding knife having a cutting edge defining a peripheral radius of action with respect to the axle when the rotor is rotated about the axle along the given direction of rotation;

the improvement wherein each of the shredding assemblies further comprises:

a protective element also operatively connected to the rotor for rotating therewith along the given direction of rotation, the protective element extending along the respective plane of its corresponding shredding assembly and defining a peripheral radius of action with respect to the axle when the rotor is rotated about the axle, the protective element being positioned upstream of and being aligned with the shredding knife during rotation of the rotor, and the peripheral radius of action of the protective element being substantially identical to the peripheral radius of action defined by the cutting edge of the shredding knife so that said shredding knife is protected by the passage of the protective element during operation of the shredding head.

Preferably, the protective element comprises a hammer, which is preferably removably mountable onto its corresponding shredding assembly and is preferably made of a carbide material.

Alternatively, and preferably also, the protective element comprises a disk operatively mounted onto the rotor for rotating therewith along the given direction of rotation, the disk extending substantially along the respective plane of its corresponding shredding assembly, the disk comprising a peripheral edge having a segment defining a peripheral radius of action with respect to the axle when the rotor is rotated about the axle, the peripheral radius of action of the segment of the peripheral edge of the disk being substantially identical to the peripheral radius of action defined by the cutting edge of the shredding knife so that said shredding knife is protected by the passage of the disk during operation of the shredding head.

According to another aspect of the invention, there is also provided a mobile sylvicultural apparatus for travelling over a terrain containing vegetation to be cut and processed, the mobile sylvicultural apparatus comprising:

a steerable wheeled base frame comprising a horizontally-extending ground-clearing section, and first and second opposite vertical side sections;

motor means for imparting motion to the support frame;

at least one shredder head comprising:
  an elongated axle;
  a rotor mounted onto the axle, the rotor being rotable about the axle along a given direction of rotation;
  a plurality of shredding assemblies, each of the shredding assemblies being mounted to the rotor for rotating therewith along the given direction of rotation, and each of the shredding assemblies being positioned adjacent to one another and extending along a respective plane transversal to the axle, each of the shredding assemblies comprising:
  a support operatively connected to the rotor for rotating therewith along the given direction of rotation;
  a shredding knife securely mounted onto the support, for cutting vegetation to be processed, the shredding knife having a cutting edge defining a peripheral radius of action with respect to the axle when the rotor is rotated about the axle along the given direction of rotation;
  wherein each of the shredding assemblies further comprises:
  a protective element also operatively connected to the rotor for rotating therewith along the given direction of rotation, the protective element extending along the respective plane of its corresponding shredding assembly and defining a peripheral radius of action with respect to the axle when the rotor is rotated about the axle, the protective element being positioned upstream of and being aligned with the shredding knife during rotation of the rotor, and the peripheral radius of action of the protective element being substantially identical to the peripheral radius of action defined by the cutting edge of the shredding knife so that said shredding knife is protected by the passage of the protective element during operation of the shredding head; and control means for controlling the steerable wheeled base frame, the motor means, and the at least one shredded head.

According to yet another aspect of the invention, there is also provided a kit for assembling the present the shredder head.

According to yet another aspect of the invention, there is also provided a method of operating the shredder head and/or the mobile sylvicultural apparatus as described and exemplified herein.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF A PREFERRED EMBODIMENT OF THE INVENTION

Figure 1:
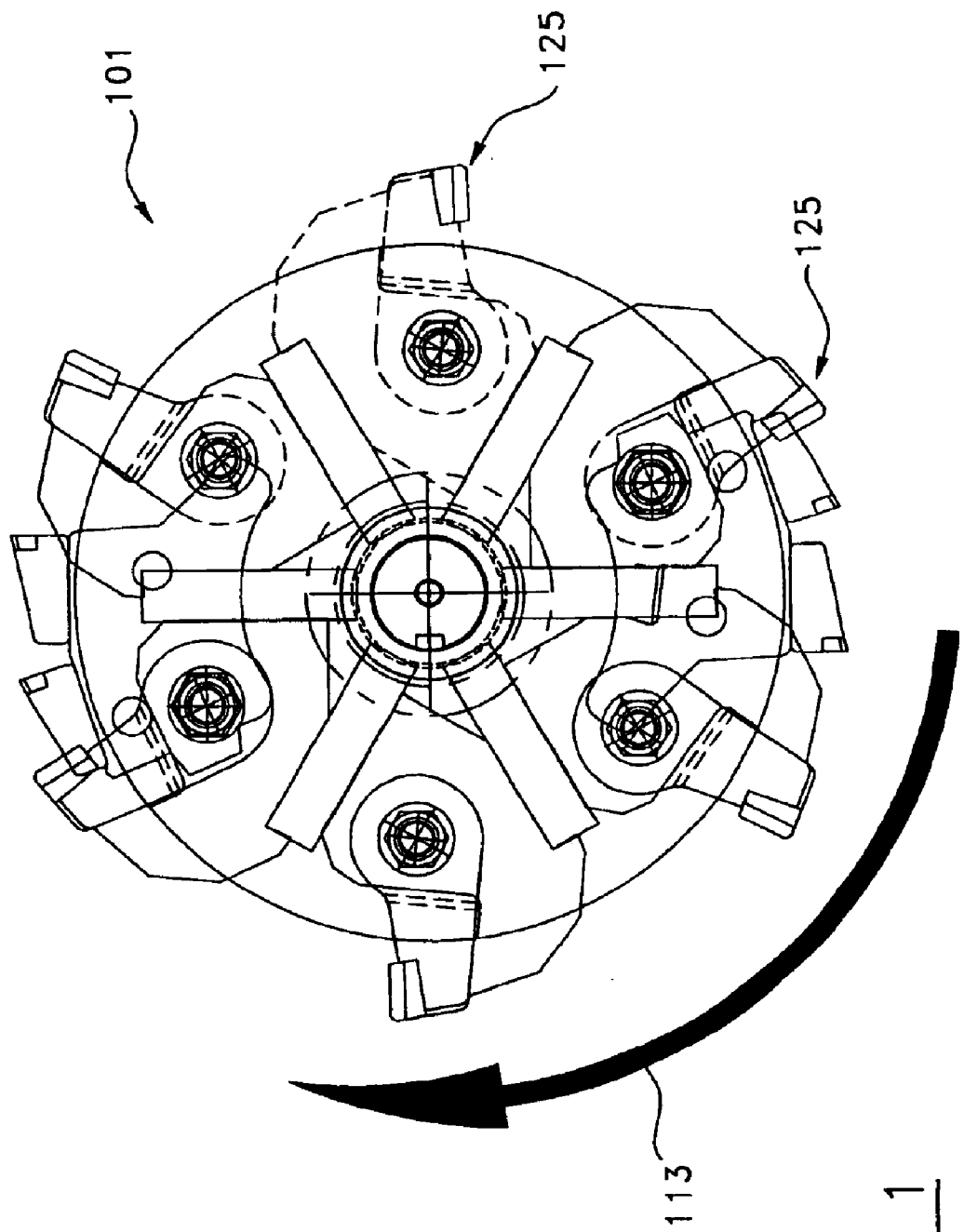
FIG. 1 is a side view of a grinding head according to the prior art, said grinding head being shown operated along a given direction of rotation and with adjacent grinding assemblies, each of said grinding assemblies including a hammer.
Figure 2:
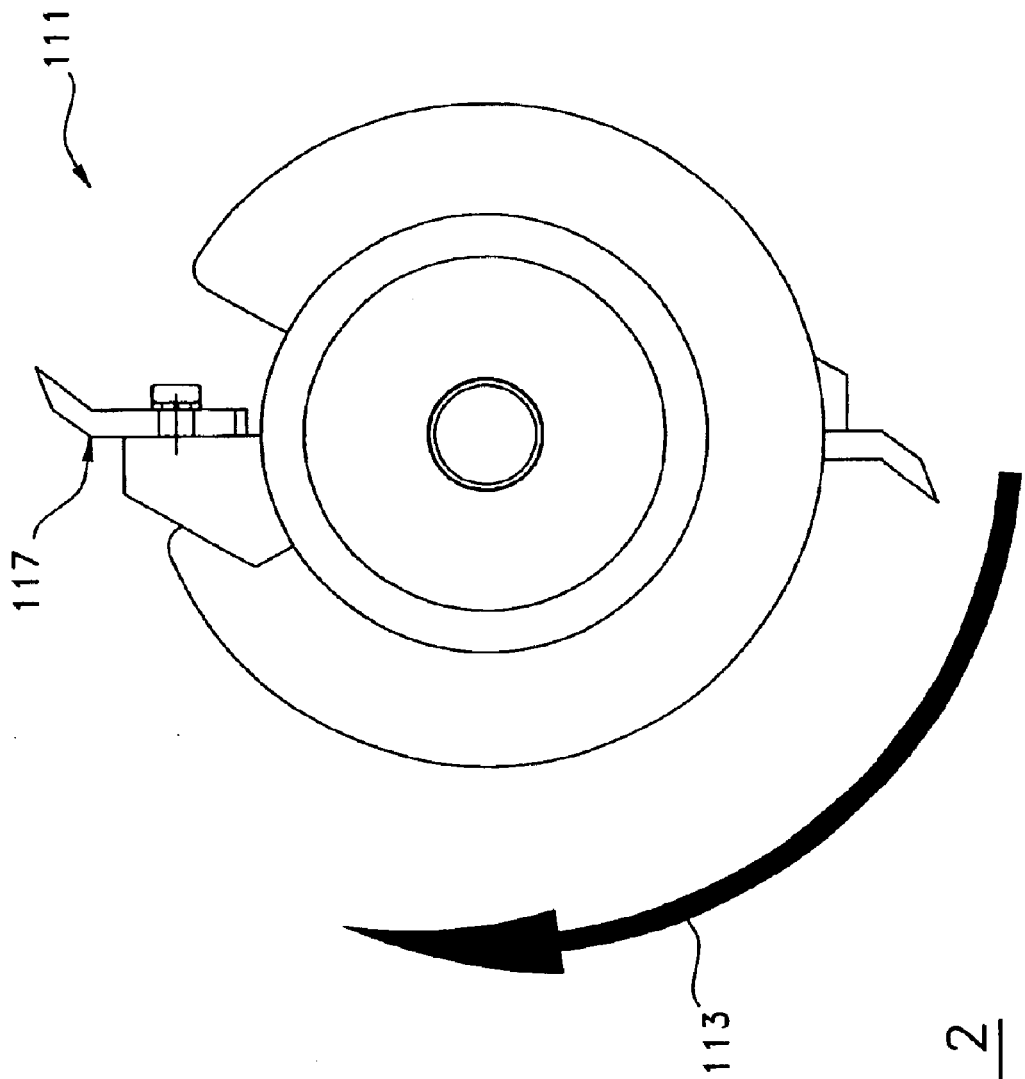
FIG. 2 is a side view of a pair of adjacent shredding assemblies of a shredder head according to the prior art, said shredding assemblies being shown operated along a given direction of rotation and each shredding assembly including a shredding knife.
Figure 3:
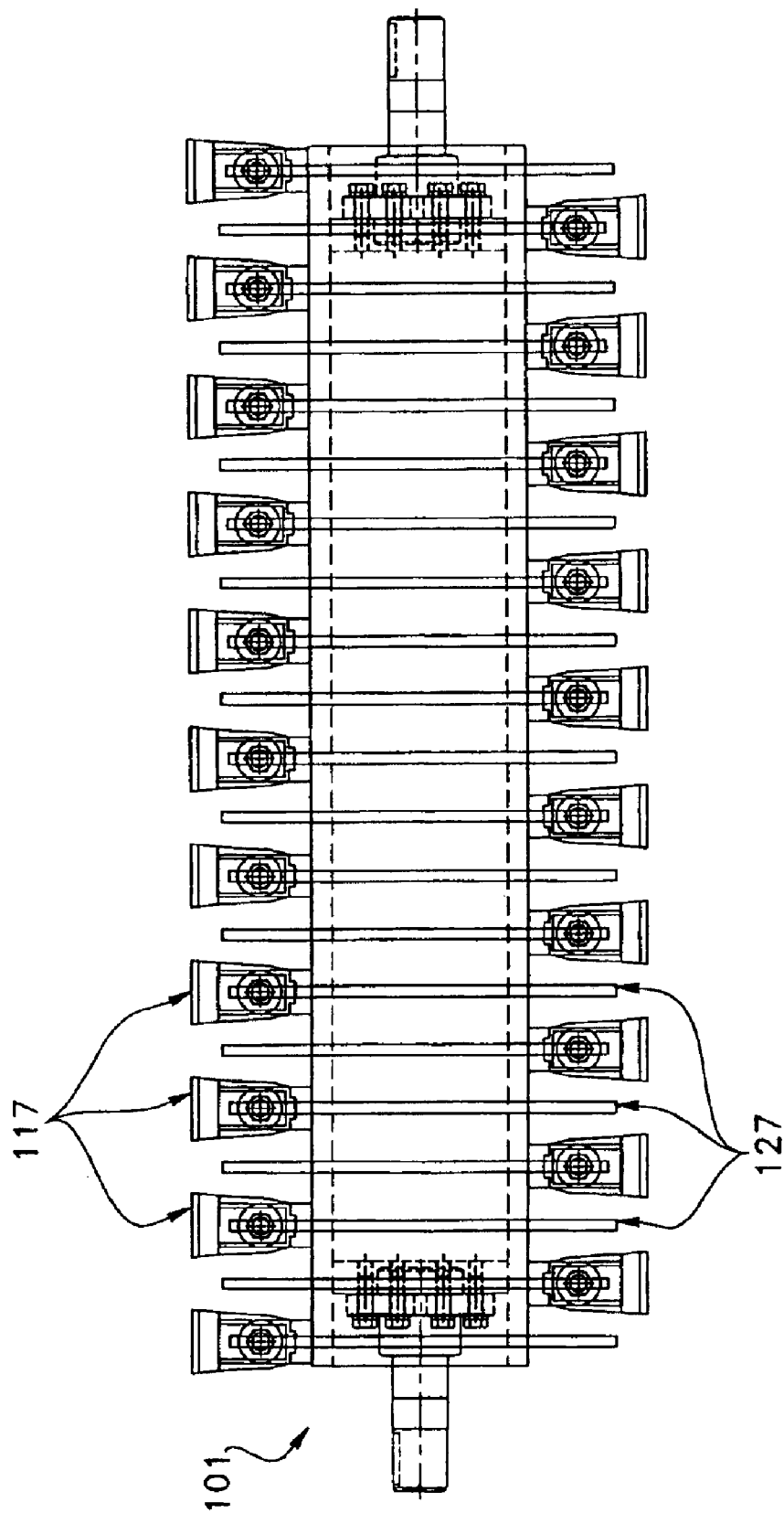
FIG. 3 is a front view of a shredder head according to the prior art, the shredder head being shown with a plurality of adjacent shredding assemblies.
Figure 5:
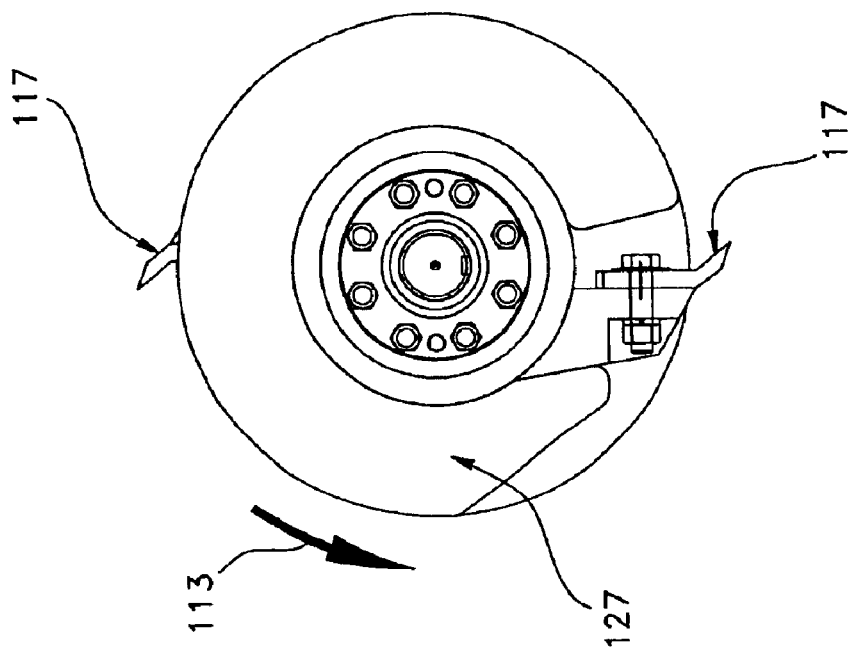
FIG. 5 is another side view of what is shown in FIG. 4, the shredding assembly being shown now after a turn of about 180 degrees.
Figure 4:
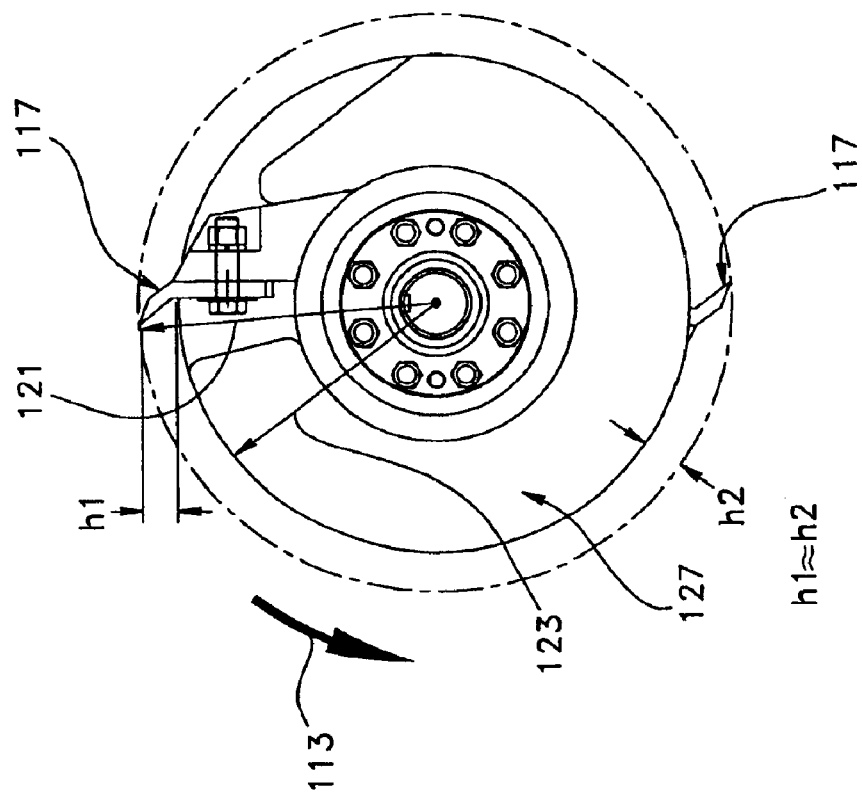
FIG. 4 is a side view of one of the shredding assemblies of the shredder head shown in FIG. 3, said shredding assembly being operated along a given direction of rotation.

In the following description, the same numerical references refer to similar elements. The embodiments shown in FIGS. 6–12 are preferred.

Moreover, although the present invention was primarily designed as a shredder head 1 for use with a mobile sylvicultural apparatus 3 for cutting and processing (e.g. clearing) applications and the like, various types of vegetation, such a brush, trees and others, it may be used on other types of apparatuses 3 and vehicles, and in various other different fields, such as construction, mining, agriculture and the like, and for treating other items, as apparent to a person skilled in the art. For this reason, expressions such as "shredder", "cutting", "processing", "sylvicultural", "trees", "brush", etc., used herein should not be taken as to limit the scope of the present invention and includes all other kinds of objects and/or applications with which the present invention could be used and may be useful.

Moreover, in the context of the present invention, the expressions "shredder" and "head", as well as any other equivalent expressions and/or compound words thereof, may be used interchangeably. The same applies for any other mutually equivalent expressions, such as "processing", "treating", "manipulating", "shredding" and "cutting" for example, as well as "vegetation", "brush" and "trees", as also apparent to a person skilled in the art.

In addition, although the preferred embodiment of the present invention as illustrated in the accompanying drawings comprises various components such as hammers, disks, hardened coatings, etc., and although the preferred embodiment of the shredder head 1 and corresponding parts as shown consist of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations thereinbetween, as well as other suitable geometrical configurations may be used for the shredder head 1 and corresponding parts according to the present invention, as will be briefly explained herein and as can be easily inferred herefrom, without departing from the scope of the present invention.

Broadly described, the present invention, as illustrated in the accompanying drawings, relates to an improved shredder head 1, and to a mobile apparatus 3 provided with such a shredder head 1. Typically, a mobile apparatus 3 comprises a pair of such shredder heads 1, as can be easily understood when referring to FIGS. 11 and 12.

According to the preferred embodiment of the present invention, the mobile apparatus 3 is a mobile "sylvicultural" apparatus 3, such as the ones described in Applicant's U.S. Pat. Nos. 6,550,505 and 6,698,478, which are intended to carry out various types of "sylvicultural" applications, such as land clearing and the like, for example. The content of these patents are incorporated herein by reference.

Figure 11:
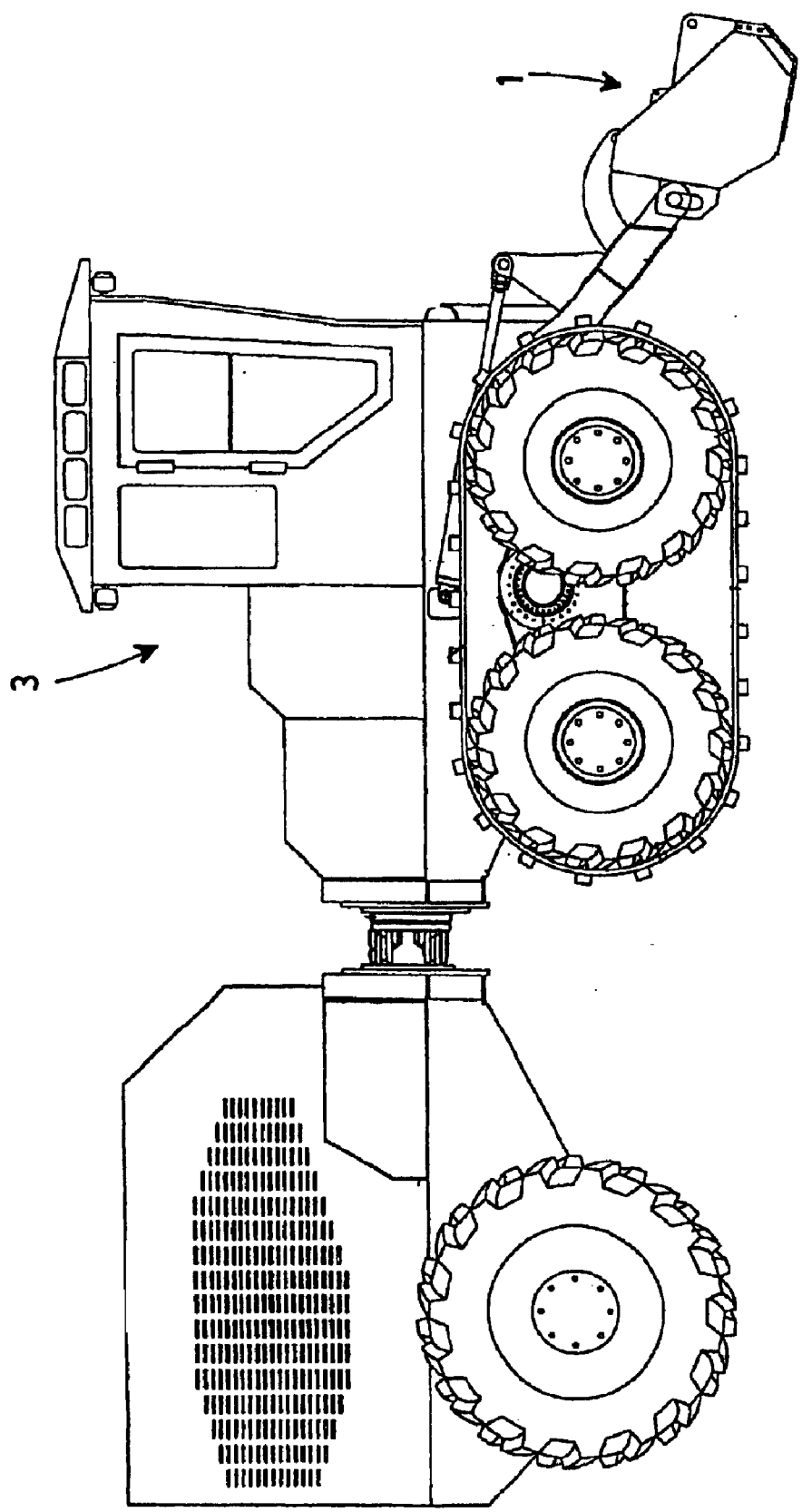
FIG. 11 is a side view of a mobile sylvicultural apparatus provided with shredder heads according to the present invention.
Figure 12:
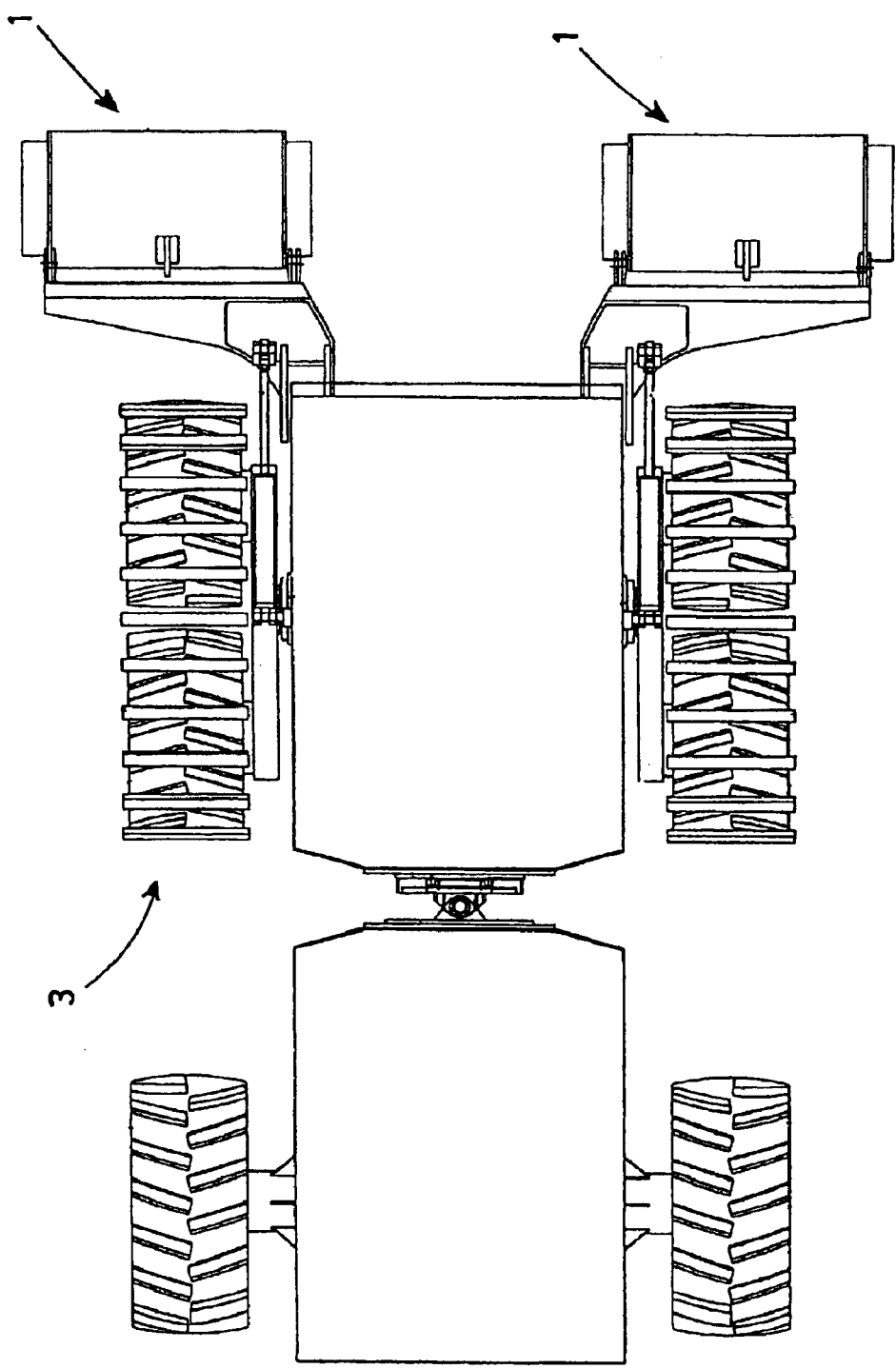
FIG. 12 is a top view of what is shown in FIG. 11.

Indeed, broadly described, and as can be easily understood when referring to FIGS. 11 and 12, the mobile sylvicultural apparatus 3 according to the present invention is preferably used for travelling over a given terrain for carrying out sylvicultural work on said terrain (e.g. cutting and processing vegetation found thereon, such as brush, trees, and the like; land clearing; and the like). The mobile sylvicultural apparatus 3 comprises a steerable wheeled base frame comprising a horizontally extending ground-clearing section, and first and second opposite vertical side sections; motor means for imparting motion to the support frame; at least one shredder head 1 (preferably a pair of shredder heads 1, as shown in FIG. 12) used for cutting and processing said vegetation; and control means for controlling the steerable wheeled base frame, the motor means, and each shredder head 1.

Thus, as may now be better appreciated, the present invention relates in general to the field of brush cutters and the like for carrying out various sylvicultural applications, such as pre-commercial clearing procedures, for example. In particular, the present invention relates to a shredder head 1 intended to, but not exclusively, grind and shred different types of vegetation, such as brush, trees, and the like, which may be present on the ground of a terrain to be treated with the use of the mobile sylvicultural apparatus 3.

According to the present invention, and as will be easily understood from the following description, the shredder head 1 according to the present invention is not only intended to cut and process vegetation from the terrain, but also, by virtue of its protective elements 5, which may act as grinding elements 5, may also be used for grinding and treating the terrain over which the shredder head 1 is used, as apparent to a person skilled in the art.

Figure 6:
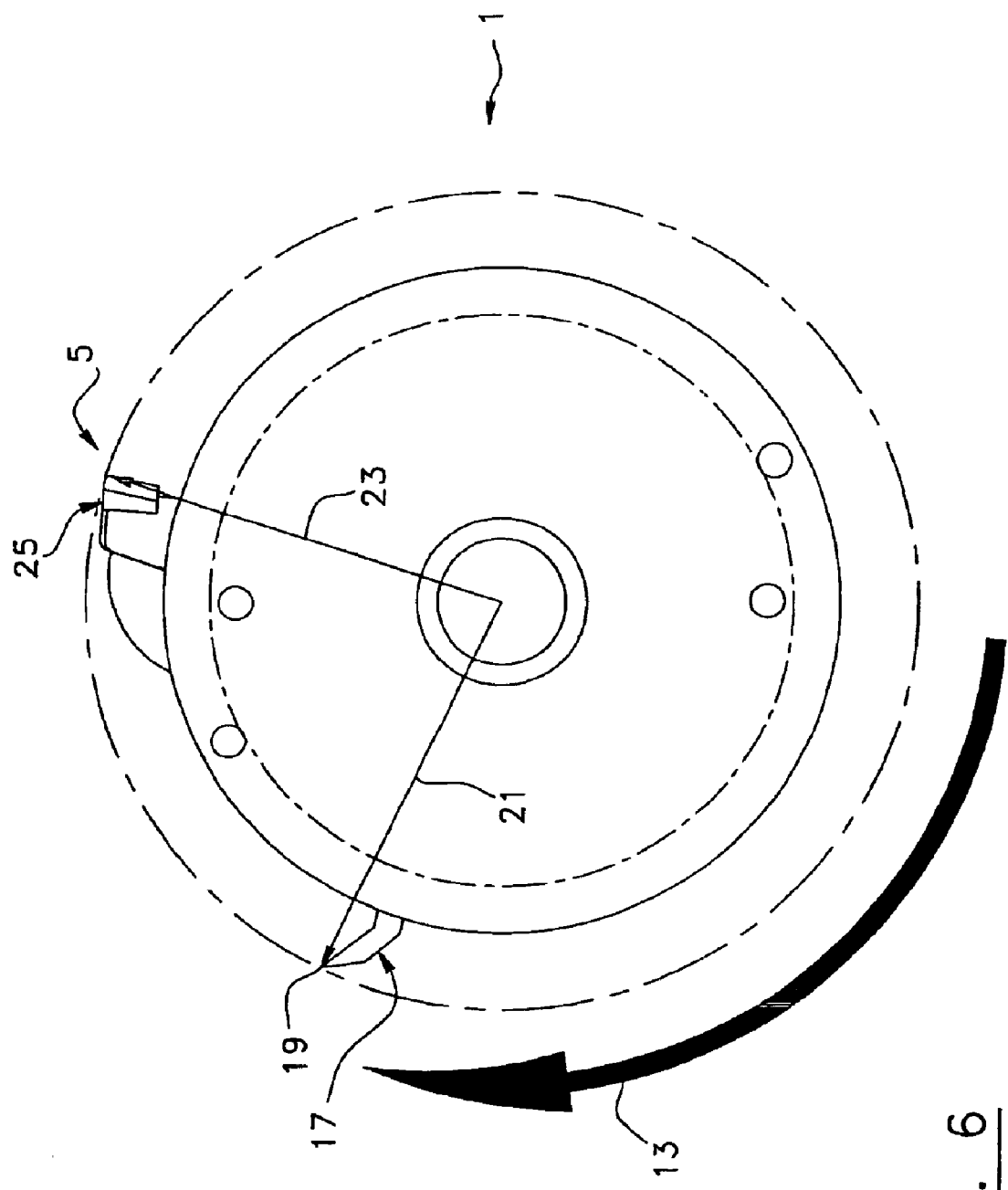
FIG. 6 is a side view of a shredding assembly according to a preferred embodiment of the present invention, said shredding assembly being shown operated along a given direction of rotation and including a shredding knife and a hammer upstream of the knife acting as a protective element.
Figure 7:
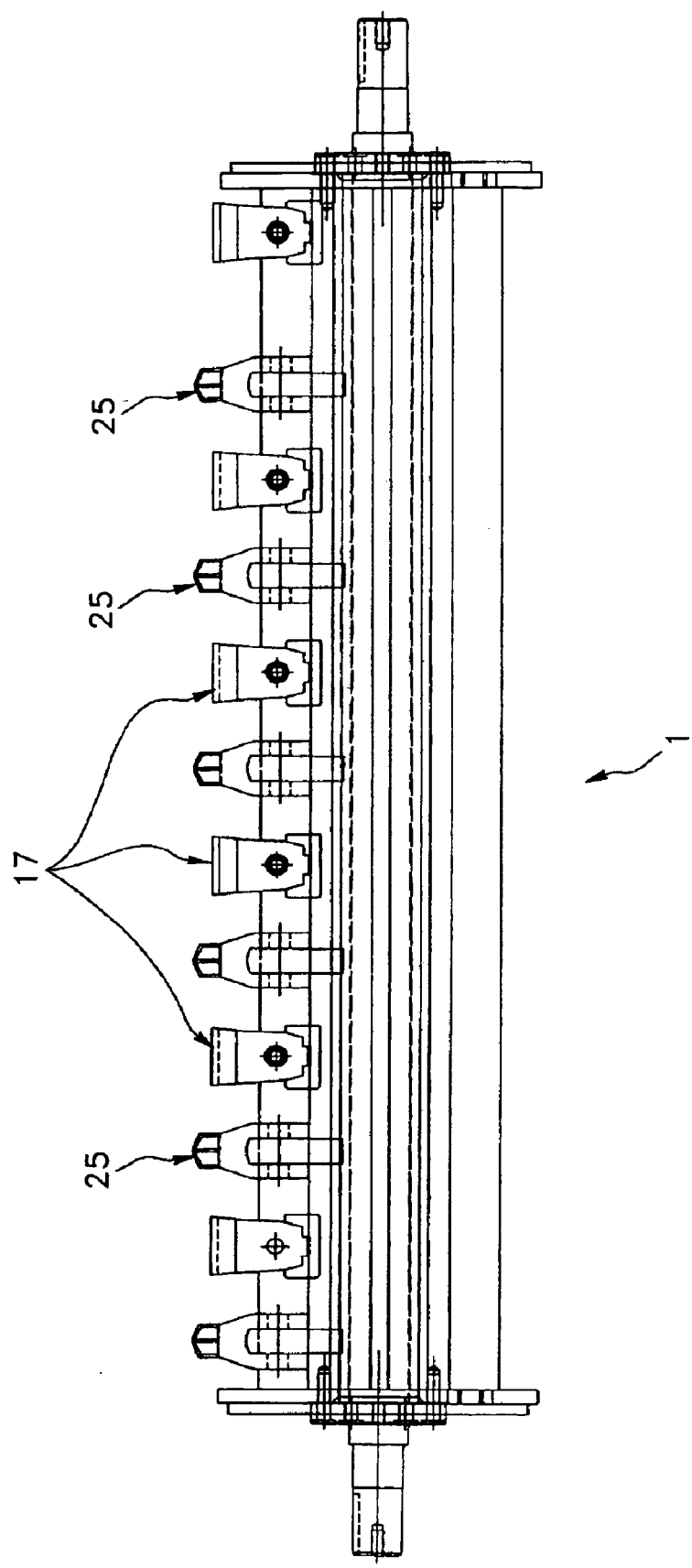
FIG. 7 is a front view of a shredder head according to a preferred embodiment of the present invention, the shredder head being shown with a plurality of adjacent shredding assemblies such as the one represented in FIG. 6.
Figure 8:
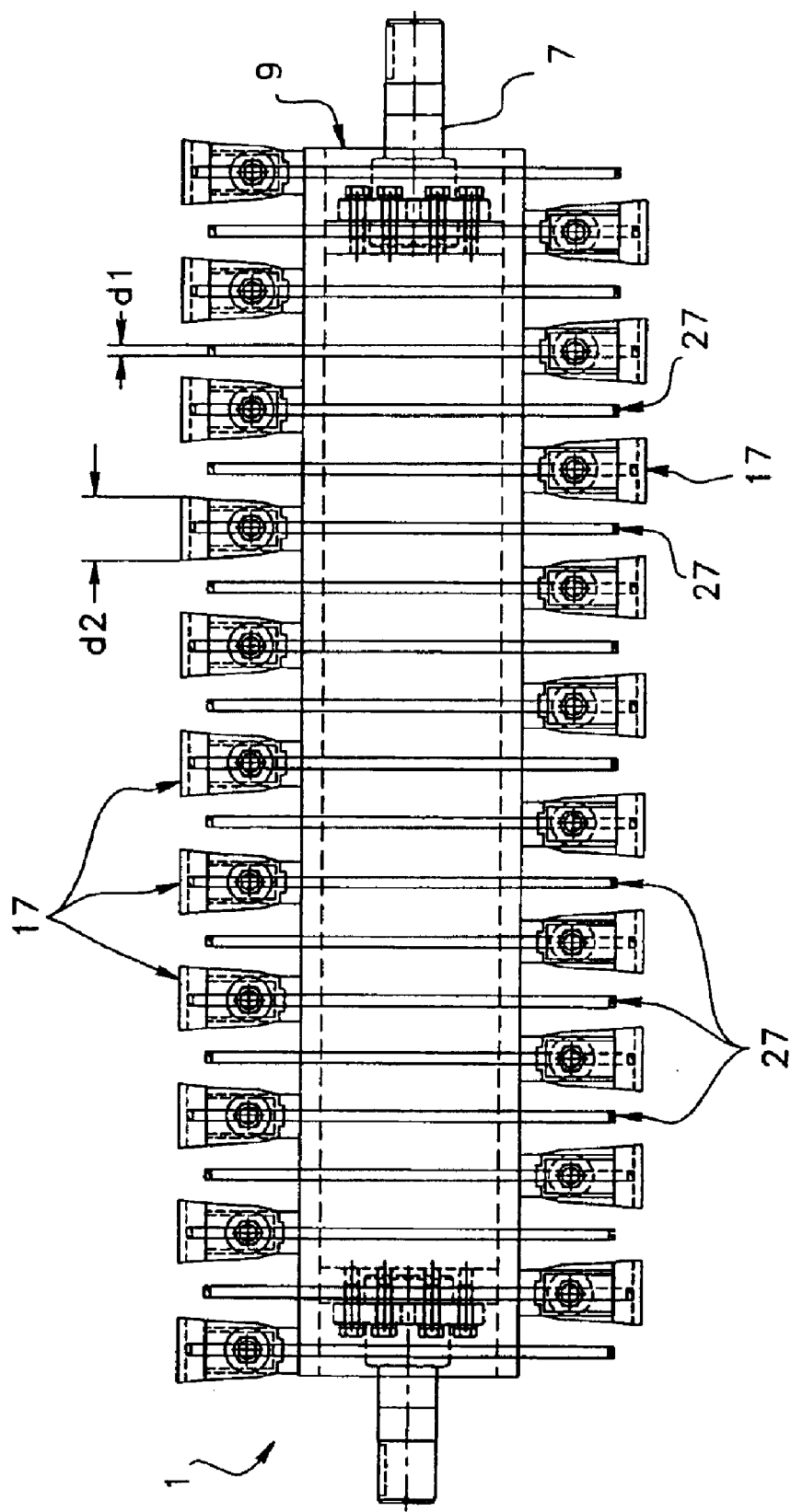
FIG. 8 is a front view of a shredder head according to another preferred embodiment of the present invention, the shredder head being shown with a plurality of adjacent shredding assemblies, each shredding assembly including a shredding knife and a corresponding disk acting as a protective element.

According to the present invention, and as better illustrated in the accompanying drawings, the shredder head 1 comprises an elongated axle 7, a rotor mounted onto the axle 7, and a plurality of shredding assemblies 11, as better shown in FIGS. 7 and 8. As can be easily understood, the rotor 9 is rotatable about the axle 7 along a given direction of rotation 13. Moreover, each of the shredding assemblies 11 is mounted to the rotor 9 for rotating therewith along the given direction of rotation 13. As shown in the drawings, each of the shredding assemblies 11 is preferably positioned adjacent to one another and extends along a respective plane transversal to the axle 7. Each of the shredding assemblies 11 comprises a support 15 and a shredding knife 17, as better shown in FIGS. 6, 9 and 10. The support 15 is operatively connected to the rotor 9 for rotating therewith along the given direction of rotation 13, and the shredding knife 17 is securely mounted onto the support 15, for cutting vegetation to be processed and carrying other applications, as can be easily understood by a person skilled in the art.

Figure 9:
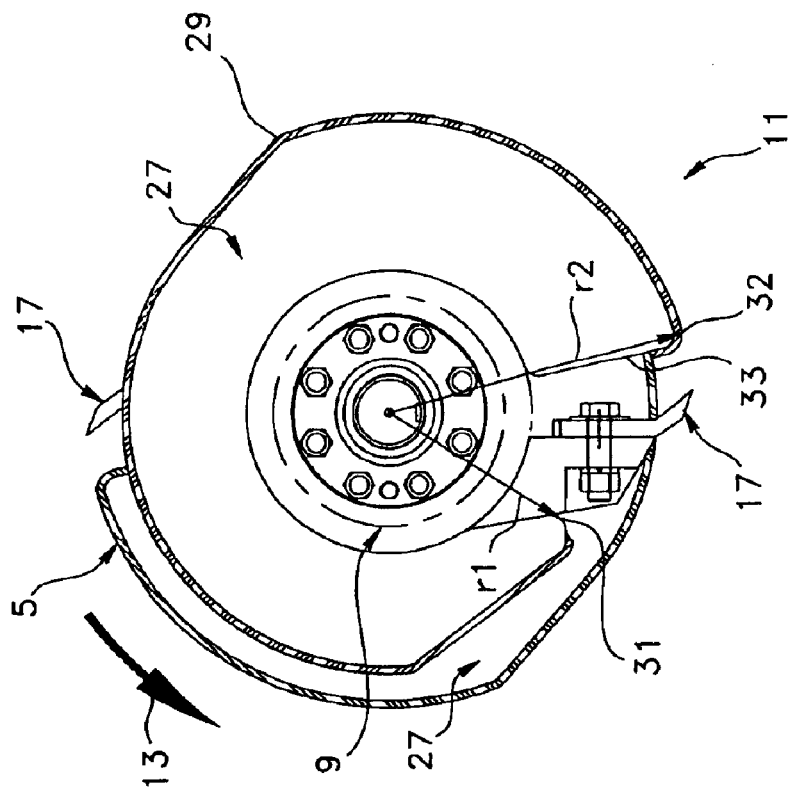
FIG. 9 is a side view of one of the shredding assemblies of the shredder head shown in FIG. 8, said shredding assembly being operated along a given direction of rotation.
Figure 10:
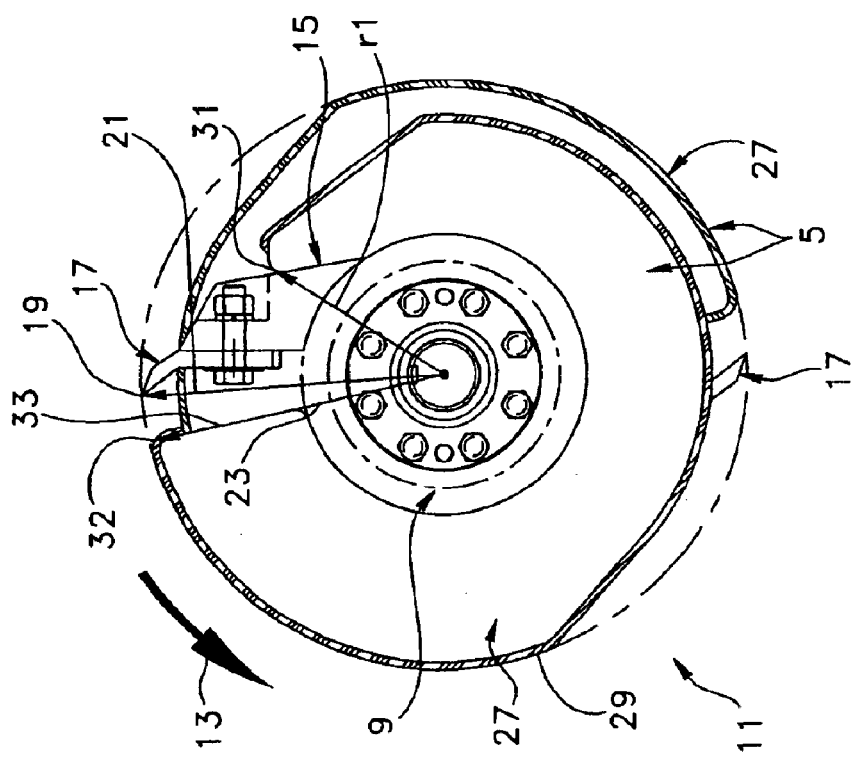
FIG. 10 is another side view of what is shown in FIG. 9, the shredding assembly being shown now after a turn of about 180 degrees.

As also better shown in FIGS. 6, 9 and 10, the shredding knife 17 has a cutting edge 19 defining a peripheral radius of action 21 with respect to the axle 7 when the rotor 9 is rotated about the axle 7 along the given direction of rotation 13. To ease the understanding of the invention, the present description will generally relate to only one single shredding assembly 11. Indeed, as shown in FIGS. 6–10, an important aspect of the present invention is that each of the shredding assemblies 11 comprises a protective element 5 also operatively connected to the rotor 9 for rotating therewith along the given direction of rotation 13. The protective element 5 extends along the respective plane of its corresponding shredding assembly 11 and defines a peripheral radius of action 23 with respect to the axle 7 when the rotor 9 is rotated about the axle 7, as better shown in FIGS. 6, 9 and 10. Moreover, the protective element 5 is positioned upstream and is aligned with the shredding knife 17 during rotation of the rotor 9; in other words, the protective element 5 rotates and passes before the shredding knife 17 which follows the protective element 5, as can be easily understood when referring to FIGS. 9 and 10. Another important aspect of the present invention resides in the fact that the peripheral radius of action 23 of the protective element 5 is substantially identical to the peripheral radius of action 21 defined by the cutting edge 19 of the shredding knife 17 so that, as can be easily understood when referring to FIGS. 6 and 9, said shredding knife 17 is thus protected by the passage of the protective element 5 during operation of the shredding head 1, that is, the protective element 5 acts as a "lead blocker/protector" for the shredding knife 1.

Thus, it may now be better understood that the provision of such a protective element 5 and its cooperation and positioning with respect to the shredding knife 17 enables to carry out grinding applications and the like, while most importantly, protecting the shredding knife 17 from substantial premature wear, and/or breaking, and enabling the same to carry out its main functions, namely, cutting applications.

According to a first preferred embodiment of the present invention, as better shown in FIGS. 6 and 7, the protective element 5 preferably comprises a hammer 25, and this hammer 25 is preferably removable mountable onto its corresponding shredding assembly 11, for enabling easy maintenance and/or replacement of the hammer 25, as is well known in the art. Moreover, the hammer 25 is preferably made of a suitable material, such as carbide, and the like, or with any other suitable material for sustaining the different loads to which it will be subject to depending on the particular applications of the shredder head 1, as apparent to a person skilled in the art.

Alternatively, and according to another preferred embodiment of the present invention, as better shown in FIGS. 8–10, the protective element 5 may comprise a disk 27 operatively mounted onto the rotor 9 for rotating therewith along the given direction of rotation 13. The disk 27 preferably extends substantially along the respective plane of its corresponding shredding assembly 11, and comprises a peripheral edge 29 having a segment defining a peripheral radius of action 23 with respect to the axle 7 when the rotor 9 is rotated about the axle 7. In order to carry out its protective purposes, the peripheral radius of action 23 of the segment of the peripheral edge 29 of the disk 27 is preferably substantially identical to the peripheral radius of action 21 defined by the cutting edge 19 of the shredding knife 17, as can be easily understood when referring to FIGS. 9–10, so that said shredding knife 17 is protected by the passage of the disk 27 during operation of the shredding head 1. It is worth pointing out though that according to the present invention, when there is mention of "the peripheral radius of action 23 of the protective element 5 being 'substantially identical' to the peripheral radius of action 21 defined by the cutting edge 19 of the shredding knife 17", "substantially identical" may also include "slightly greater" or "slightly smaller", depending on the particular applications for which the shredder head 1 is intended and the desired outcome of the terrain and/or vegetation to be treated, as apparent to a person skilled in the art.

Preferably also, the peripheral edge 29 of the disk 27 is provided with a hardened coating, which may consist of any suitable material, depending on the particular applications for which the shredder head 1 is intended, as also apparent to a person skilled in the art.

Preferably also, and similarly with regards to the above-described hammer 25, the disk 27 is removably mountable onto its corresponding shredding assembly 11, by various suitable fastening means, such as welding, bolting, and the like, as apparent to a person skilled in the art. This enables namely easy maintenance and/or replacement of the disk 27.

As better shown in FIGS. 9 and 10, the peripheral edge 29 of the disk 27 preferably defines various different peripheral radiuses of action with respect to the axle 7, at different locations along the peripheral edge 29 of the disk 27.

More particularly, the peripheral edge 29 of the disk 27 preferably comprises a circumferential segment having a variable radius from the axle 7 between first and second extremities 31,32, as better illustrated in FIG. 9. Indeed, as shown, the first extremity 31 is preferably located adjacent to the support 15 of the shredding knife 17, on a rear side of the knife, and at a first radius r1 from the axle 7, and the second extremity 32 is preferably located adjacent to a front side of the knife 17, and at a second radius r2 from the axle 7, the second radius r2 from the axle 7 at the second extremity 32 being preferably greater than the first radius r1 from the axle 7 at the first extremity 31.

Preferably also, and as better shown in FIG. 9, the second radius r2 from the axle 7 at the second extremity 32 of the peripheral edge 29 of the disk 27 is substantially identical to the peripheral radius of action defined 21 by the cutting edge 19 of the shredding knife 17, so as to protect said shredding knife 17, in the manner explained above, and as apparent to a person skilled in the art.

Moreover, the peripheral edge 29 of the disk 27 preferably further comprises a radial segment 33 extending between the second extremity 32 of the circumferential segment and a hub of the rotor 9, as also better shown in FIG. 9.

When referring to FIG. 8, it can be easily understood that according to the preferred embodiment of the present invention, each shredding assembly 11 preferably has a disk 27 having a thickness d1 smaller than the thickness d2 of its corresponding shredding knife 17. Moreover, and preferably also, each shredding assembly 11 is rotatably offset with respect to an adjacent shredding assembly 11 by about 180 degrees, although different other offsets may be suitable according to the present invention, as apparent to a person skilled in the art.

As may now be better appreciated from the above-described, during the operation of a mobile sylvicultural apparatus 3, and for a given shredding assembly 11, vegetation to be cut and/or processed, slides on either side of the disk 27 as the shredder head 1 is passed thereover and after which the vegetation is shredded by the cutting edge 19 of the corresponding shredding knife 17 associated to this same disk 27 and exceeding the thickness of the disk 27, or is either shredded by the cutting edge 19 of a shredding knife 17 of an adjacent shredding assembly 11, after about half a turn of the rotor 9.

If the shredder head 1 encounters rocks and other unwanted debris (in terms of nature, size, etc.), one or several protective elements 5 (e.g. hammers 25, disks 27, etc.) are faced against the same, thus protecting the shredding knives 17. It is possible that very small thin rocks may nevertheless slide through the disks 27. However, their reduced size enable the shredding knives 17 to break them easily, in most cases, as apparent to a person skilled in the art. Thus, as may now be better appreciated, by virtue of the protective elements 5 and their disposition along the shredder head 1 according to the present invention, the wear of the shredding knives 17 is thus substantially reduced, thereby enabling the shredder head 1 to be used for a longer period of time with a same given set of shredding knives 17, which is advantageous in terms of efficiency and costs. The protective elements 5 (hammers 25, disks 27, etc.) which are intended to protect the shredding knives 17 against the aforementioned rocks and other unwanted debris, but may also be used as grinding elements 5 for treating terrain, may, as a result, wear out a little more quickly and are thus, as previously explained, preferably provided with suitable hardened coatings or shells, for properly sustaining impact against the rocks and other unwanted debris, and are also preferably devised to be easily repairable and/or replaceable from their corresponding shredding assemblies 11, if need may be, as apparent to a person skilled in the art. Thus, it may be now better appreciated that the shredder head 1 and its corresponding protective elements 5 according to the present invention enables to carry out a grinding and/or shredding at ground level of a terrain by limiting the breaking of and the premature wear of the shredding knives 17, and is particularly useful for carrying out various sylvicultural applications, such as shredding per band, namely semi-mechanized pre-commercial clearing, for example.

It is worth mentioning that several modifications could be made to the shredder head 1 and corresponding mobile sylvicultural apparatus 3 without departing from the scope of the present invention. For example, the space between the shredding knives 17; the space between the protective elements 5, hammers 25, and/or disks 27; the thickness of the same; the shape of the disks 27; the shape of the shredding knives 17; as well as the manufacturing materials of the different components, such as the hammers 25, disks 27, hardened coatings of the disks 27, shredding knives 17, etc.; could be changed, without altering the protective nature of the protective elements 5, according to the present invention, as explained above, and as apparent to a person skilled in the art.

Furthermore, it may also be appreciated that the present invention could be used on existing shredder heads by simply adding protective elements 5 such as the ones described herein, onto existing shredding assemblies of conventional shredder heads, by suitable fastening means, such as by bolting, welding, and the like, as also apparent to a person skilled in the art.

As may now be better appreciated, the present invention is a substantial improvement over the prior art in that, as aforementioned, an important aspect of the present invention resides in the fact that instead of having an exposed shredding knife which is more likely to premature wear as a result of encounters with rocks and/or other unwanted debris, as is the case with conventional shredder heads, the shredder head 1 according to the present invention comprises protective elements 5 such as the ones described and exemplified herein, each of which protects its corresponding shredding knife and may also act as a grinding element 5. As explained hereinabove, this is very advantageous, in terms of efficiency, safety, time and costs.

It is worth mentioning once again that although the present invention was primarily intended for sylvicultural applications, the present shredded head 1, and the apparatus 3 provided with such a head 1 (or plurality of heads 1), may be used in other fields and for other applications, such as for mining applications, agricultural applications, and the like, as apparent to a person skilled in the art, without departing from the scope of the present invention.

Of course, numerous modifications could be made to the above-described embodiments without departing from the scope of the invention, as defined in the appended claims.

What is claimed is:

1. A shredder head for passing over a terrain to be treated and with vegetation to be cut and processed, the shredder head comprising:
   an elongated axle;
   a rotor mounted onto the axle, the rotor being rotable about the axle along a given direction of rotation;
   a plurality of shredding assemblies, each of the shredding assemblies being mounted to the rotor for rotating therewith along the given direction of rotation, and each of the shredding assemblies being positioned adjacent to one another and extending along a respective plane transversal to the axle, each of the shredding assemblies comprising:
      a support operatively connected to the rotor for rotating therewith along the given direction of rotation;
      a shredding knife securely mounted onto the support, for cutting vegetation to be processed, the shredding knife having a cutting edge defining a peripheral radius of action with respect to the axle when the rotor is rotated about the axle along the given direction of rotation;
   the improvement wherein each of the shredding assemblies further comprises:
      a protective element also operatively connected to the rotor for rotating therewith along the given direction of rotation, the protective element extending along the respective plane of its corresponding shredding assembly and defining a peripheral radius of action with respect to the axle when the rotor is rotated about the axle, the protective element being positioned upstream of and being aligned with the shredding knife during rotation of the rotor, and the peripheral radius of action of the protective element being substantially identical to the peripheral radius of action defined by the cutting edge of the shredding knife so that said shredding knife is protected by the passage of the protective element during operation of the shredding head, the protective element comprising a disk operatively mounted onto the rotor for rotating therewith along the given direction of rotation, the disk extending substantially along the respective plane of its corresponding shredding assembly, the disk comprising a peripheral edge having a segment defining a peripheral radius of action with respect to the axle when the rotor is rotated about the axle, the peripheral radius of action of the segment of the peripheral edge of the disk being substantially identical to the peripheral radius of action defined by the cutting edge of the shredding knife so that said shredding knife is protected by the passage of the disk during operation of the shredding head, the peripheral edge of the disk defining various different peripheral radiuses of action with respect to the axle, at different locations along the peripheral edge of the disk.

2. A shredder head according to claim 1, wherein the protective element comprises a hammer.

3. A shredder head according to claim 2, wherein the hammer is removably mountable onto its corresponding shredding assembly.

4. A shredder head according to claim 3, wherein the hammer is a hammer made of a carbide material.

5. A shredder head according to claim 1, wherein the peripheral edge of the disk is provided with a hardened coating.

6. A shredder head according to claim 1, wherein the disk is removably mountable onto its corresponding shredding assembly.

7. A shredder head according to claim 1, wherein the peripheral edge of the disk comprises a circumferential segment having a variable radius from the axle between first and second extremities, the first extremity being located adjacent to the support of the shredding knife, on a rear side of the knife, and at a first radius from the axle, and the second extremity being located adjacent to a front side of the knife, and at a second radius from the axle, the second radius from the axle at the second extremity being greater than the first radius from the axle at the first extremity.

8. A shredder head according to claim 7, wherein the second radius from the axle at the second extremity of the peripheral edge of the disk is substantially identical to the peripheral radius of action defined by the cutting edge of the shredding knife.

9. A shredder head according to claim 8, wherein the peripheral edge of the disk further comprises a radial segment extending between the second extremity of the circumferential segment and a hub of the rotor.

10. A shredder head according to claim 1, wherein each shredding assembly has a disk having a thickness smaller than the thickness of its corresponding shredding knife.

11. A shredder head according to claim 1, wherein each shredding assembly is rotatably offset with respect to an adjacent shredding assembly by about 180 degrees.

12. A mobile sylvicultural apparatus for travelling over a terrain containing vegetation to be cut and processed, the mobile sylvicultural apparatus comprising:
   a steerable wheeled base frame comprising a horizontally extending ground-clearing section, and first and second opposite vertical side sections;

motor means for imparting motion to the support frame;

at least one shredder head comprising:

an elongated axle;

a rotor mounted onto the axle, the rotor being rotable about the axle along a given direction of rotation;

a plurality of shredding assemblies, each of the shredding assemblies being mounted to the rotor for rotating therewith along the given direction of rotation, and each of the shredding assemblies being positioned adjacent to one another and extending along a respective plane transversal to the axle, each of the shredding assemblies comprising:

a support operatively connected to the rotor for rotating therewith along the given direction of rotation;

a shredding knife securely mounted onto the support, for cutting vegetation to be processed, the shredding knife having a cutting edge defining a peripheral radius of action with respect to the axle when the rotor is rotated about the axle along the given direction of rotation;

wherein each of the shredding assemblies further comprises:

a protective element also operatively connected to the rotor for rotating therewith along the given direction of rotation, the protective element extending along the respective plane of its corresponding shredding assembly and defining a peripheral radius of action with respect to the axle when the rotor is rotated about the axle, the protective element being positioned upstream of and being aligned with the shredding knife during rotation of the rotor, and the peripheral radius of action of the protective element being substantially identical to the peripheral radius of action defined by the cutting edge of the shredding knife so that said shredding knife is protected by the passage of the protective element during operation of the shredding head, the protective element comprising a disk operatively mounted onto the rotor for rotating therewith along the given direction of rotation, the disk extending substantially along the respective plane of its corresponding shredding assembly, the disk comprising a peripheral edge having a segment defining a peripheral radius of action with respect to the axle when the rotor is rotated about the axle, the peripheral radius of action of the segment of the peripheral edge of the disk being substantially identical to the peripheral radius of action defined by the cutting edge of the shredding knife so that said shredding knife is protected by the passage of the disk during operation of the shredding head, the peripheral edge of the disk defining various different peripheral radiuses of action with respect to the axle, at different locations along the peripheral edge of the disk; and control means for controlling the steerable wheeled base frame, the motor means, and the at least one shredded head.

13. A mobile sylvicultural apparatus according to claim 12, wherein the protective element comprises a hammer.

14. A mobile sylvicultural apparatus according to claim 12, wherein the peripheral edge of the disk is provided with a hardened coating.

15. A mobile sylvicultural apparatus according to claim 12, wherein the peripheral edge of the disk comprises a circumferential segment having a variable radius from the axle between first and second extremities, the first extremity being located adjacent to the support of the shredding knife, on a rear side of the knife, and at a first radius from the axle, and the second extremity being located adjacent to a front side of the knife, and at a second radius from the axle, the second radius from the axle at the second extremity being greater than the first radius from the axle at the first extremity.

16. A mobile sylvicultural apparatus according to claim 15, wherein the second radius from the axle at the second extremity of the peripheral edge of the disk is substantially identical to the peripheral radius of action defined by the cutting edge of the shredding knife.

17. A mobile sylvicultural apparatus according to claim 12, wherein each shredding assembly has a disk having a thickness smaller than the thickness of its corresponding shredding knife, and wherein each shredding assembly is rotatably offset with respect to an adjacent shredding assembly by about 180 degrees.

* * * * *